United States Patent
Queipo (12)

(10) Patent No.: US 6,379,091 B1
(45) Date of Patent: Apr. 30, 2002

(54) DEVICE FOR HOLDING A NOZZLE OF A HOSE OF A VACUUM SOURCE TO A DRILL PRESS IN A PREDETERMINED ORIENTATION TO A WORK PIECE

(76) Inventor: Juan C. Queipo, PMB 307, 10773 NW. 58th St., Miami, FL (US) 33178

( * ) Notice: Subject to any disclaimer, the term of this patent is extended or adjusted under 35 U.S.C. 154(b) by 64 days.

(21) Appl. No.: 09/713,284

(22) Filed: Jul. 5, 2000

(51) Int. Cl.⁷ .............................................. B23Q 11/00
(52) U.S. Cl. ........................................ 409/137; 408/67
(58) Field of Search ...................... 408/61, 60, 67, 408/241 R; 409/136, 137; 451/456, 442; 83/100; 144/252.1; 403/345, 354, 384, 389, 395, 299, 290, 289

(56) References Cited

U.S. PATENT DOCUMENTS

| | | | |
|---|---|---|---|
| 3,837,383 A | 9/1974 | Ko | 144/251 A |
| 4,037,982 A | * 7/1977 | Clement | 408/61 |
| 4,184,226 A | * 1/1980 | Loevenich | 15/415 R |
| 4,205,728 A | 6/1980 | Gloor et al. | 175/209 |
| 4,750,536 A | 6/1988 | Grisley | 144/251 B |
| 4,984,352 A | * 1/1991 | Reed et al. | 29/568 |
| 5,033,917 A | 7/1991 | McGlasson et al. | 408/67 |
| 5,172,447 A | * 12/1992 | Tomm | 29/568 |
| 5,356,245 A | * 10/1994 | Hosoi et al. | 408/56 |
| 5,605,421 A | 2/1997 | Hodgson | 408/67 |
| 5,688,082 A | * 11/1997 | Richardson | 408/67 |
| 5,988,954 A | 11/1999 | Gaskin et al. | 408/67 |

* cited by examiner

*Primary Examiner*—Daniel W. Howell
(74) *Attorney, Agent, or Firm*—Richard L. Miller

(57) ABSTRACT

A device for holding a nozzle of a hose of a vacuum source to a drill press. The device includes a first portion for attaching to the drill press and a second portion operatively connected to the first portion for holding the nozzle of the hose of the vacuum source in a predetermined orientation to a work piece. The first portion is T-shaped and includes a first tube for attaching to the drill press and a second tube that extends perpendicularly-outwardly from the first tube thereof and which is internally threaded and has a pair of throughslots that extend axially therealong. The second portion is substantially T-shaped and includes a tube for holding the nozzle of the hose of the vacuum source and an appendage that extends perpendicularly-outwardly from the tube thereof. The appendage is externally threaded and is threadably received in the second tube of the first portion so as to allow the tube of the second portion to be rotated relative to the first tube of the first portion for allowing the nozzle of the hose of the vacuum source to be orientated to the work piece.

22 Claims, 1 Drawing Sheet

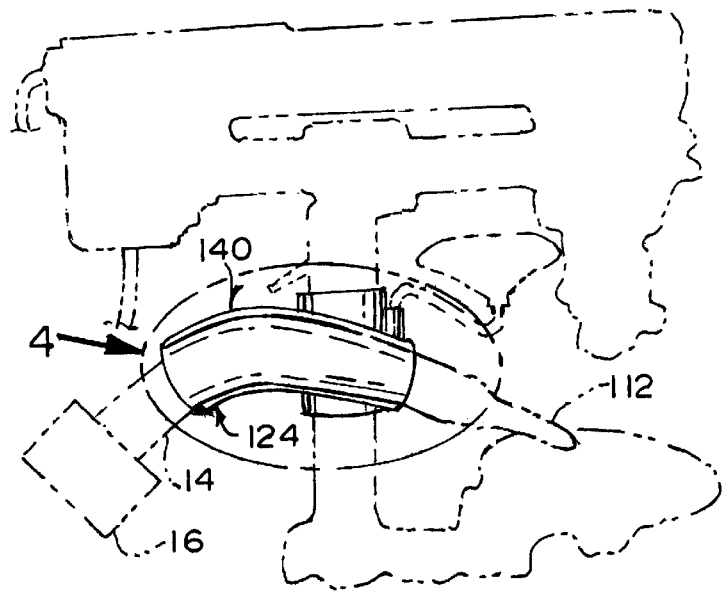
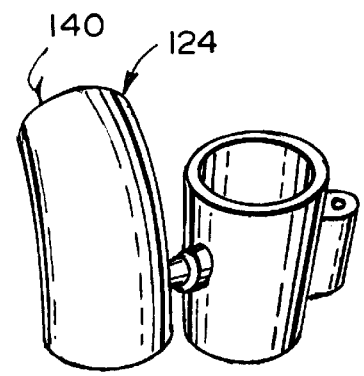
Fig. 3
Fig. 4
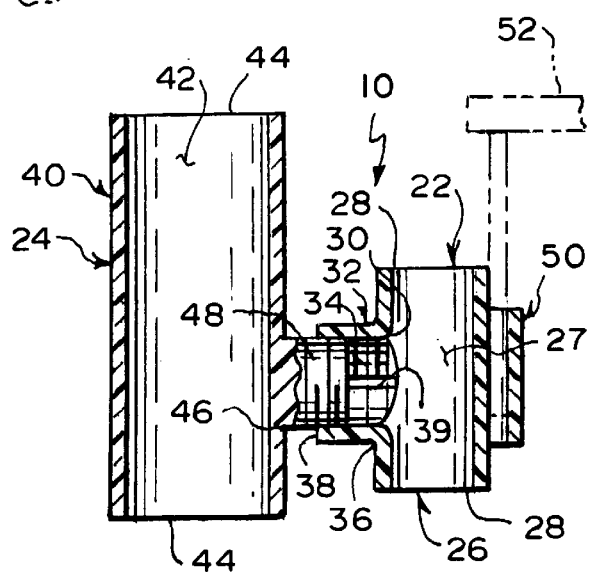
Fig. 2
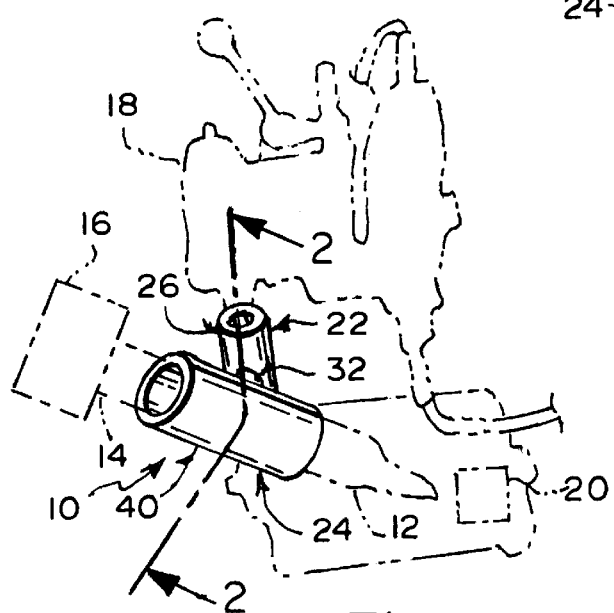
Fig. 1

DEVICE FOR HOLDING A NOZZLE OF A HOSE OF A VACUUM SOURCE TO A DRILL PRESS IN A PREDETERMINED ORIENTATION TO A WORK PIECE

BACKGROUND OF THE INVENTION

1. Field of the Invention

The present invention relates to a device for holding a nozzle to a drill press. More particularly, the present invention relates to a device for holding a nozzle of a hose of a vacuum source to a drill press in a predetermined orientation to a work piece.

2. Description of the Prior Art

Numerous innovations for dust collectors for tools have been provided in the prior art that will be described. Even though these innovations may be suitable for the specific individual purposes to which they address, however, they differ from the present invention.

A FIRST EXAMPLE, U.S. Pat. No. 3,837,383 to Ko teaches apparatus for creating a vacuum about a tool for the removal of dust, work chips, etc., generated by contact between the tool and the workpiece. A tubular or cylindrical collecting device is mounted for horizontal and vertical adjustment relative to the tool mounting apparatus and is provided with a tangentially arranged suction apparatus for creating a partial vacuum within the device. In order to allow the operator to follow the contact of the tool with the workpiece visually, in the preferred embodiment the apparatus is manufactured of a transparent material. The device is also a guard to prevent fingers or hands coming in contact with the rotating bit during operation.

A SECOND EXAMPLE, U.S. Pat. No. 4,205,728 to Gloor et al. teaches a suction attachment for use with a drilling tool that includes a muzzle part forming an opening through which a drill bit extends into contact with the material to be drilled. The muzzle part has a suction aperture communicating with the drill bit opening and a suction tube connected to the suction aperture. The suction tube includes a venturi tube section having a transverse plane of smallest cross-section spaced from the suction aperture. Extending from the transverse plane is a connecting passage which terminates at its other end in a suction recess formed in the surface of the muzzle part which faces the material to be drilled. The partial vacuum generated at the venturi tube section is transmitted through the connecting passage to the suction recess for holding the attachment on the material to be drilled.

A THIRD EXAMPLE, U.S. Pat. No. 4,750,536 to Grisley teaches a waste attachment for a router. A first housing is connected to a vacuum source and attached to a router base. A second housing is slidably attached to the first housing. An arm extends from the second housing and ends in an inlet to receive router waste. The arm is used when the waste attachment is in its useful position on a router, into contact with the work piece being routed.

A FOURTH EXAMPLE, U.S. Pat. No. 5,033,917 to McGlasson et al. teaches a chip extraction apparatus for extracting chip swarf from a workpiece for collection in an external vacuum source. The chip extraction apparatus is comprised of a nosepiece assembly which houses a spring/atmospheric pressure actuated piston for providing telescopic capabilities to a drill bushing. The drill bushing contains an air inlet port for allowing air to be drawn into the interior of the drill bushing where it will mix with chip swarf. The air application assists chip flow and contributes to efficient vacuum withdrawal of chip swarf from the drill flutes into the vacuum chamber of the nosepiece assembly. The chip swarf is eventually expelled through a vacuum port in the nosepiece assembly to the external vacuum source. Alternative drill bushing configurations are disclosed to provide consistent chip extraction rates for different material requirements and cutting tool types. Additionally, a means for introducing coolant/lubricant or pressurized air to, and removing coolant/lubricant or pressurized air from, the surface of the workpiece is disclosed. The chip extraction apparatus is disclosed in the context of both a portable drill used in conjunction will drill plates and a handheld drill in which the nosepiece assembly is eliminated, but the chip extraction capability is retained.

A FIFTH EXAMPLE, U.S. Pat. No. 5,605,421 to Hodgson teaches a dust extractor for use with a power drill that comprises a housing having two compartments and sealed from one another and a tube extending from the opening to an outlet. The tube has a valve having a recess enabling a flow of air to pass from the opening to the outlet whilst the vacuum is applied to the housing. Operation of the valve enables waste material to be drawn from the working site and for suction to be released.

A SIXTH EXAMPLE, U.S. Pat. No. 5,988,954 to Gaskin et al. teaches a vacuum attachment device that contains a drill attachment portion and a vacuum mounting portion. The drill attachment portion is further composed of a longitudinally truncated cylinder section and a lower funnel section. The cylinder section has first and second snap-on arms and a rear cylinder aperture. The lower funnel section has a lower funnel connection aperture which connects to the cylinder section at the rear aperture. The vacuum mounting portion contains a hose attachment section and an upper funnel section. A vacuum mounting portion bonding surface connects the vacuum mounting portion to the drill attachment portion bonding surface of the drill attachment portion.

It is apparent that numerous innovations for dust collectors for tools have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a device for holding a nozzle of a hose of a vacuum source to a drill press in a predetermined orientation to a work piece that avoids the disadvantages of the prior art.

ANOTHER OBJECT of the present invention is to provide a device for holding a nozzle of a hose of vacuum source to a drill press in a predetermined orientation to a work piece that is simple and inexpensive to manufacture.

STILL ANOTHER OBJECT of the present invention is to provide a device for holding a nozzle of a hose of a vacuum source to a drill press in a predetermined orientation to a work piece that is simple to use.

BRIEFLY STATED, YET ANOTHER OBJECT of the present invention is to provide a device for holding a nozzle of a hose of a vacuum source to a drill press. The device includes a first portion for attaching to the drill press and a second portion operatively connected to the first portion for holding the nozzle of the hose of the vacuum source in a predetermined orientation to a work piece. The first portion is T-shaped and includes a first tube for attaching to the drill press and a second tube that extends perpendicularly-outwardly from the first tube thereof and which is internally threaded and has a pair of throughslots that extend axially therealong. The second portion is substantially T-shaped and includes a tube for holding the nozzle of the hose of the vacuum source and an appendage that extends perpendicularly-outwardly from the tube thereof. The appendage is externally threaded and is threadably received in the second tube of the first portion so as to allow the tube of the second portion to be rotated relative to the first tube of the first portion for allowing the nozzle of the hose of the vacuum source to be orientated to the work piece.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic front elevational view of a first embodiment of the present invention in use;

FIG. 2 is an enlarged diagrammatic cross sectional view taken on line 2—2 in FIG. 1;

FIG. 3 is a diagrammatic front elevational view of a second embodiment of the present invention in use; and FIG. 4 is a diagrammatic perspective view of the area generally enclosed by the dotted curve identified by arrow 4 in FIG. 3.

LIST OF REFERENCE NUMERALS UTILIZED IN THE DRAWING

First Embodiment 10 device of present invention for holding nozzle 12 of hose 14 of vacuum source 16 to drill press 18 in predetermined orientation to work piece 20
12 nozzle of hose 14 of vacuum source 16
14 hose of vacuum source 16
16 vacuum source
18 drill press
20 workpiece
22 first portion for attaching to drill press 18
24 second portion for holding nozzle 12 of hose 14 of vacuum source 16
26 first tube of first portion 22 for attaching to drill press 18
27 interior of first tube 26 of first portion 22
28 pair of free terminal ends of first tube 26 of first portion 22
30 midpoint of first tube 26 of first portion 22
32 second tube of first portion 22
34 interior of second tube 32 of first portion 26
36 proximal end of second tube 32 of first portion 26
38 free distal end of second tube 32 of first portion 26
39 pair of throughslots in second tube 32 of first portion 26
40 tube of second portion 24 for holding nozzle 12 of hose 14 of vacuum source 16
42 interior of tube 40 of second portion 24
44 pair of free terminal ends of tube 40 of second portion 24
46 intermediate point of tube 40 of second portion 24
48 appendage of second portion 24
50 auxiliary tube of first portion for holding tray 52
52 tray Second Embodiment 112 nozzle
124 second portion
140 tube of second portion 124

DETAILED DESCRIPTION OF THE PREFERRED EMBODIMENT

Referring now to the figures, in which like numerals indicate like parts, and particularly to FIG. 1, the device of the present invention is shown generally to 10 for holding a nozzle 12 of a hose 14 of a vacuum source 16 to a drill press 18 in a predetermined orientation to a work piece 20.

The configuration of the device 10 can best be seen in FIGS. 1 and 2, and as such, will be discussed with reference thereto.

The device comprises a first portion 22 for attaching to the drill press 18.

The device further comprises a second portion 24 operatively connected to the first portion 22 for holding the nozzle 12 of the hose 14 of the vacuum source 16 in the predetermined orientation to the work piece 20.

The first portion 22 is T-shaped and comprises a first tube 26 for attaching to the drill press 18.

The first tube 26 of the first portion 22 is straight and cylindrically-shaped.

The first tube 26 of the first portion 22 has an interior 27 that is open.

The first tube 26 of the first portion 22 further has a pair of free terminal ends 28 that are open and communicate with the interior 27 thereof.

The first tube 26 of the first portion 22 further has a midpoint 30 that is disposed midway between the pair of free terminal ends 28 thereof, and which is open and communicates with the interior 27 thereof.

The first portion 22 further comprises a second tube 32 that is straight and cylindrically-shaped.

The second tube 32 of the first portion 22 extends perpendicularly-outwardly from the midpoint 30 of the first tube 26 thereof.

The second tube 32 of the first portion 26 has an interior 34 that is open, internally threaded, and communicates with the interior 27 of the first tube 26 thereof.

The second tube 32 of the first portion 26 further has a proximal end 36 that is open, communicates with the interior 34 thereof, is coincident with the midpoint 30 of the first tube 26 thereof, and communicates with the interior 27 of the first tube 26 thereof.

The second tube 32 of the first portion 26 further has a free distal end 38 that is open and communicates with the interior 34 thereof.

The second tube 32 of the first portion 26 further has a pair of throughslots 39 that are diametrically-opposed to each other.

The pair of throughslots 39 in the second tube 32 of the first portion 26 extend axially from the free distal end 38 thereof to the proximal end 36 thereof so as to divide the second tube 32 of the first portion 26 into a pair of separate halves that are slightly pinched together to provide a tighter fit for the second portion 24 in the second tube 32 of the first portion 26.

The second portion 24 is substantially T-shaped and comprises a tube 40 for holding the nozzle 12 of the hose 14 of the vacuum source 16.

The tube 40 of the second portion 24 is cylindrically-shaped.

The tube 40 of the second portion 24 is straight for accommodating the nozzle 12 of the hose 14 of the vacuum source 16 that is straight.

The tube 40 of the second portion 24 has an interior 42 that is open.

The tube 40 of the second portion 24 further has a pair of free terminal ends 44 that are open and communicate with the interior 42 thereof.

The tube 40 of the second portion 24 further has an intermediate point 46 that is disposed intermediate the pair of free terminal ends 44 thereof.

The second portion 24 further comprises an appendage 48 that is straight and cylindrically-shaped, and extends perpendicularly-outwardly from the intermediate point 46 of the first tube 26 thereof.

The appendage 48 of the second portion 24 is externally threaded and is threadably received in the second tube 32 of the first portion 22 so as to allow the tube 40 of the second portion 24 to be rotated relative to the first tube 26 of the first portion 22 for allowing the nozzle 12 of the hose 14 of the vacuum source 16 to be orientated to the work piece 20.

The first portion 22 further comprises an auxiliary tube 50 that extends axially along the first tube 26 thereof for holding a tray 52.

As shown in FIGS. 3 and 4, the tube 140 of the second portion 124 is curved for accommodating the nozzle 112 of the hose 14 of the vacuum source 16 that is curved.

It will be understood that each of the elements described above, or two or more together, may also find a useful application in other types of constructions differing from the types described above.

While the invention has been illustrated and described as embodied in a device for holding a nozzle of a hose of a vacuum source to a drill press in a predetermined orientation to a work piece, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. A device for holding a nozzle of a hose of a vacuum source to a drill press in a predetermined orientation to a work piece, said device comprising:
    a) a first portion for attaching to the drill press; and
    b) a second portion operatively connected to said first portion for holding the nozzle of the hose of the vacuum source in the predetermined orientation to the work piece, wherein said first portion is T-shaped and comprises a first tube for attaching to the drill press, wherein said first tube of said first portion has an interior that is open, wherein said first tube of said first portion further has a pair of free terminal ends that are open and communicate with said interior thereof, wherein said first tube of said first portion further has a midpoint that is disposed midway between said pair of free terminal ends thereof, and which is open and communicates with said interior thereof, wherein said first portion further comprises a second tube that is straight and cylindrically-shaped, wherein said second portion is substantially T-shaped and comprises a tube for holding the nozzle of the hose of the vacuum source, wherein said tube of said second portion has an interior that is open.

2. A device for holding a nozzle of a hose of a vacuum source to a drill press in a predetermined orientation to a work piece, said device comprising:
    a) a first portion for attaching to the drill press; and
    b) a second portion operatively connected to said first portion for holding the nozzle of the hose of the vacuum source in the predetermined orientation to the work piece, wherein said first portion is T-shaped and comprises a first tube for attaching to the drill press, wherein said first tube of said first portion has an interior that is open, wherein said first tube of said first portion further has a pair of free terminal ends that are open and communicate with said interior thereof, wherein said first tube of said first portion further has a midpoint that is disposed midway between said pair of free terminal ends thereof, and which is open and communicates with said interior thereof, wherein said first portion further comprises a second tube that is straight and cylindrically-shaped, wherein said second tube of said first portion has an interior that is open, internally threaded, and communicates with said interior of said first tube thereof.

3. The device as defined in claim 2, wherein said first tube of said first portion is straight and cylindrically-shaped.

4. The device as defined in claim 1, wherein said second tube of said first portion extends perpendicularly-outwardly from said midpoint of said first tube thereof.

5. The device as defined in claim 1, wherein said tube of said second portion is cylindrically-shaped.

6. The device as defined in claim 1, wherein said tube of said second portion is straight for accommodating the nozzle of the hose of the vacuum source that is straight.

7. The device as defined in claim 1, wherein said tube of said second portion is curved for accommodating the nozzle of the hose of the vacuum source that is curved.

8. The device as defined in claim 2, wherein said second tube of said first portion extends perpendicularly-outwardly from said midpoint of said first tube thereof.

9. The device as defined in claim 1, wherein said first portion further comprises an auxiliary tube that extends axially along said first tube thereof for holding a tray.

10. The device as defined in claim 2, wherein said second tube of said first portion further has a proximal end that is open, communicates with said interior thereof, is coincident with said midpoint of said first tube thereof, and communicates with said interior of said first tube thereof.

11. The device as defined in claim 10, wherein said second tube of said first portion further has a free distal end that is open and communicates with said interior thereof.

12. The device as defined in claim 11, wherein said second tube of said first portion further has a pair of throughslots that are diametrically-opposed to each other.

13. The device as defined in claim 12, wherein said pair of throughslots in said second tube of said first portion extend axially from said free distal end thereof to said proximal end thereof so as to divide said second tube of said first portion into a pair of separate halves that are slightly pinched together to provide a tighter fit for said second portion in said second tube of said first portion.

14. The device as defined in claim 1, wherein said tube of said second portion further has a pair of free terminal ends that are open and communicate with said interior thereof.

15. The device as defined in claim 2, wherein said tube of said second portion is cylindrically-shaped.

16. The device as defined in claim 2, wherein said tube of said second portion is straight for accommodating the nozzle of the hose of the vacuum source that is straight.

17. The device as defined in claim 2, wherein said tube of said second portion is curved for accommodating the nozzle of the hose of the vacuum source that is curved.

18. The device as defined in claim 1, wherein said first tube of said first portion is straight and cylindrically-shaped.

19. The device as defined in claim 2, wherein said first portion further comprises an auxiliary tube that extends axially along said first tube thereof for holding a tray.

20. The device as defined in claim 14, wherein said tube of said second portion further has an intermediate point that is disposed intermediate said pair of free terminal ends thereof.

21. The device as defined in claim 20, wherein said second portion further comprises an appendage that is straight and cylindrically-shaped, and extends perpendicularly-outwardly from said intermediate point of said first tube thereof.

22. The device as defined in claim 21, wherein said appendage of said second portion is externally threaded and is threadably received in said second tube of said first portion so as to allow said tube of said second portion to be rotated relative to said first tube of said first portion for allowing the nozzle of the hose of the vacuum source to be orientated to the work piece.

* * * * *